W. B. ESTES.
HORSE COLLAR STUFFING MACHINE.
APPLICATION FILED MAR. 30, 1908.
916,543.
Patented Mar. 30, 1909.
2 SHEETS—SHEET 2.
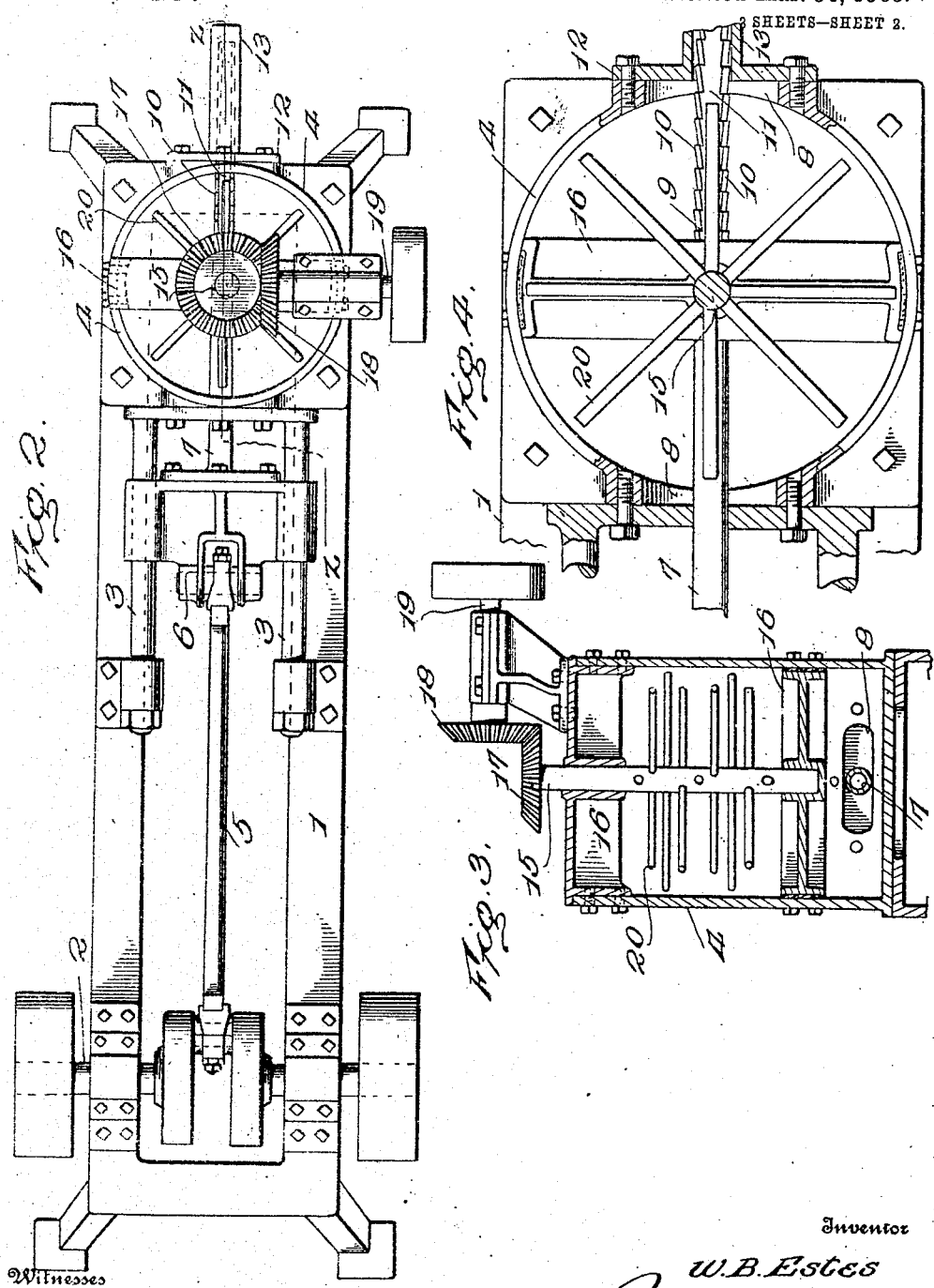
Witnesses
Inventor
W. B. Estes
By
Attorney

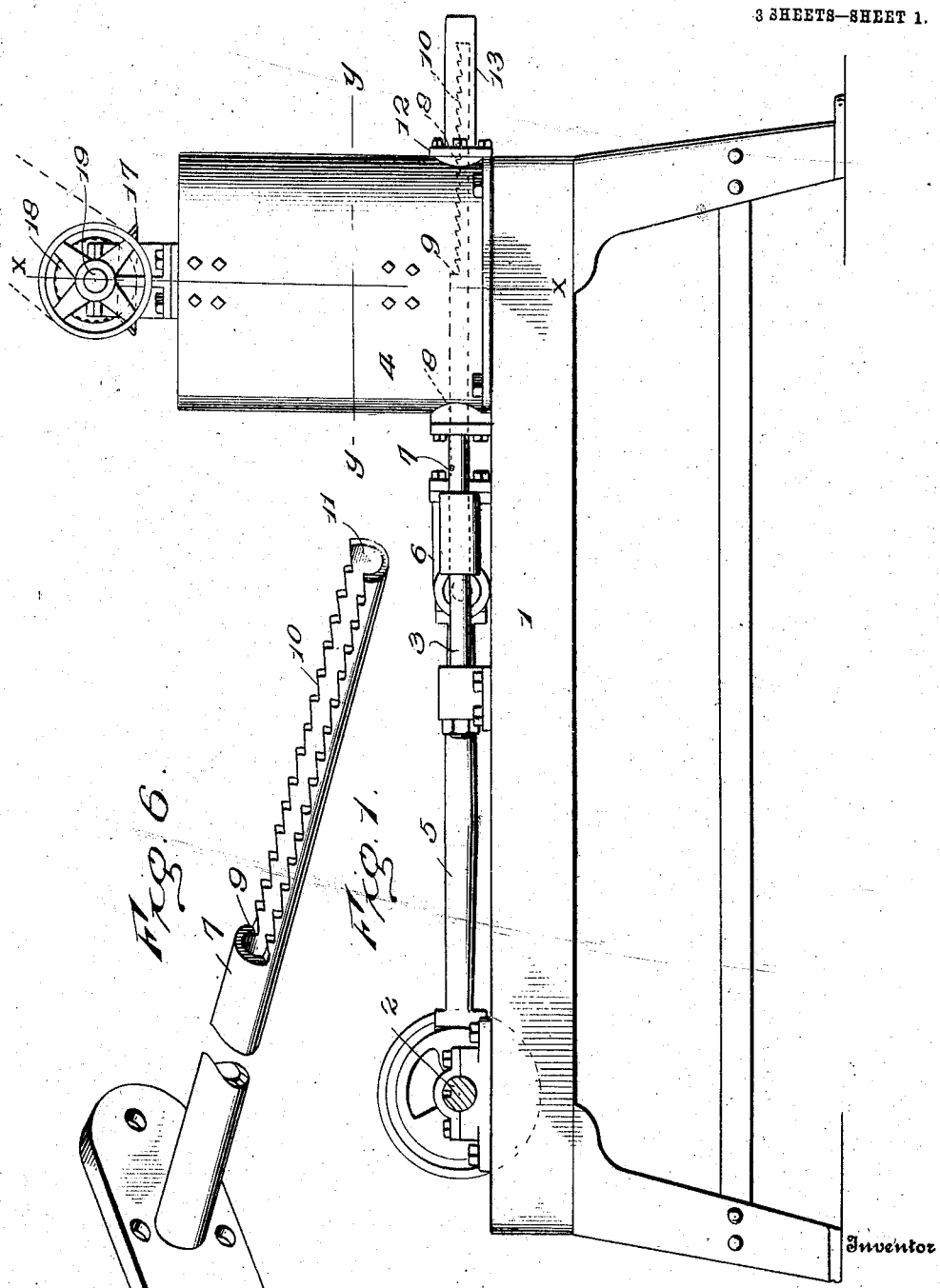

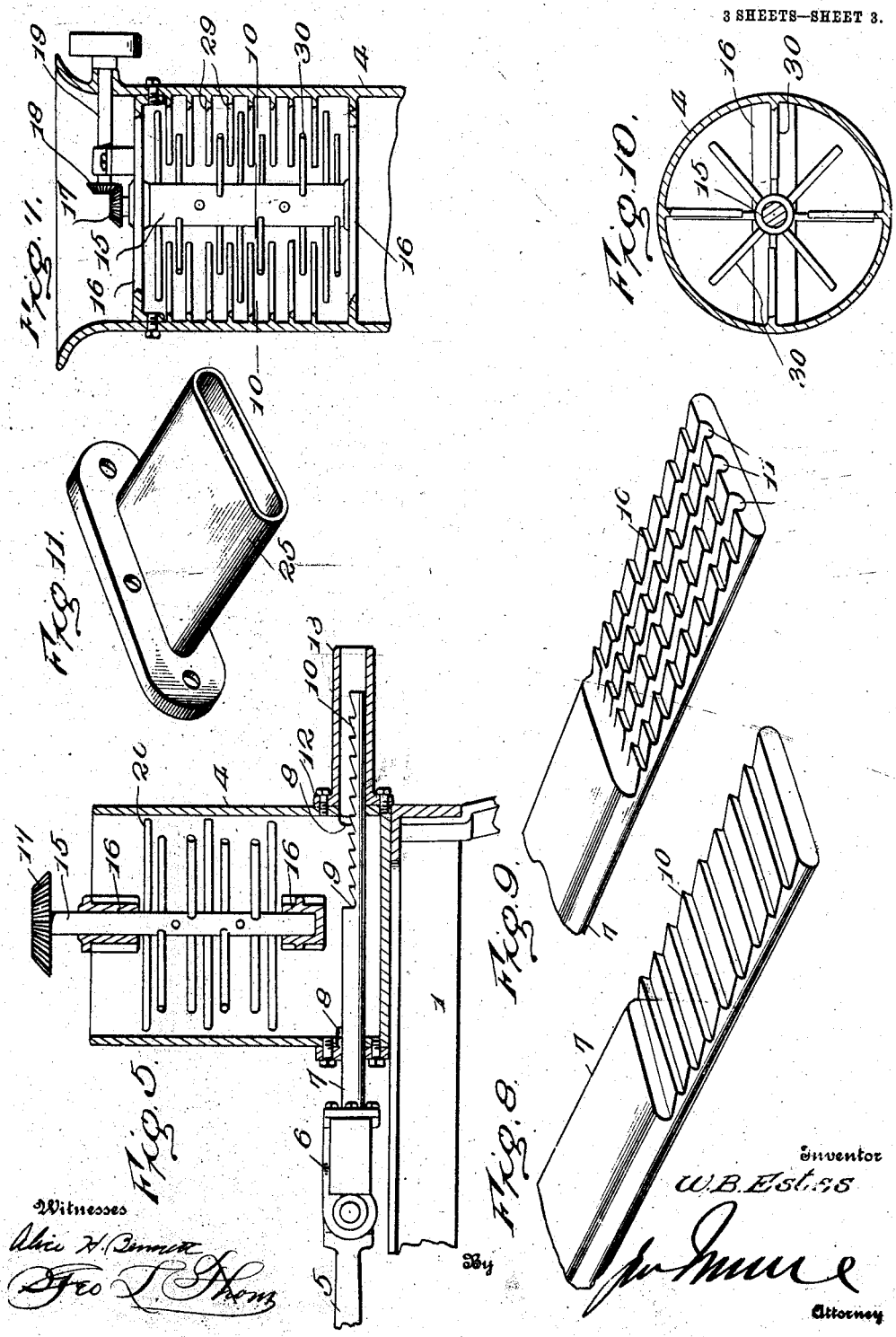

UNITED STATES PATENT OFFICE.

WILLIAM B. ESTES, OF ATLANTA, GEORGIA, ASSIGNOR OF ONE-FOURTH TO T. J. LOCHRIDGE, OF EAST END, GEORGIA, AND THREE-FOURTHS TO GEORGE W. WALKER, OF ATLANTA, GEORGIA.

HORSE-COLLAR-STUFFING MACHINE.

No. 916,543.        Specification of Letters Patent.        Patented March 30, 1909.

Application filed March 30, 1908. Serial No. 424,168.

*To all whom it may concern:*

Be it known that I, WILLIAM B. ESTES, a citizen of the United States, residing at Atlanta, in the county of Fulton and State of Georgia, have invented certain new and useful Improvements in Horse-Collar-Stuffing Machines, of which the following is a specification.

This invention relates to improvements in machines for stuffing horse collars. Considerable difficulty has been experienced in this art, because of the fact that present machines fail to uniformly feed the fibrous or stuffing material to the ram, and the latter therefore failing to uniformly pack the material in the tube to which the horse collar casing has been attached. Numerous attempts have been made to overcome these deficiencies, but without success. According to my present invention I seek to cure these defects by providing a peculiarly arranged feeder in the hopper directly over a ram of specific construction, which takes the packed material and forces it uniformly into the tube casing.

My invention, therefore, relates more particularly to the specific details of construction and arrangement of parts, which will be hereinafter described and particularly pointed out in the claims.

In the drawings: Figure 1 is a side elevation. Fig. 2 is a plan view. Fig. 3 is a section on the line x—x, Fig. 1. Fig. 4 is a horizontal section on the line y—y, Fig. 1. Fig. 5 is a section on the line z—z, Fig. 2. Fig. 6 is a detail view of the same. Fig. 7 is a vertical section of a modified form of hopper. Figs. 8 and 9, are views of different forms of rams. Fig. 10 is a section on line 10—10, Fig. 7. Fig. 11 is a detail view of a different form of tube.

1 indicates a frame supported on legs and having a bearing for a crank shaft 2, and guide-ways 3, located in front of a hopper 4. The crank shaft 2, is connected by a pitman 5, with a reciprocating cross-head 6, slidable in the ways 3, and attached to the rear of the cross-head 6, is a ram 7, which passes through openings 8, near the bottom of the hopper. The ram is in the form of a tube having the upper portion of its free end cut away as shown at 9, and the two opposite edges formed with a series of projecting teeth 10. By this formation a seat or cavity 11, is formed between the two rows of teeth to receive a wad of stuffing material at each reciprocation of the ram. Adjacent one of the openings 8, is a plate 12, having an outwardly extending tube 13, in which the toothed portion of the ram operates, the fibrous material being packed into a mass within this tube in the usual manner. But by the peculiar construction of the operative end of the ram a greater supply of material is fed into the tube, and at the same time a uniform supply is introduced.

Disposed directly over the center of movement of the ram in the hopper is a vertical shaft 15, mounted in bearings 16, and having on its upper end a beveled pinion 17, meshing with a beveled pinion 18, on a counter shaft 19. The vertical shaft 15, carries a series of bars or fingers 20, arranged in planes one above the other at an angle of 45 degrees to form a spiral formation to feed the fibrous material downwardly to the ram 7. By arranging the fingers in this manner the fibrous material at the top is moved into the plane of the next finger and so on downwardly until the ram is reached, thereby forming a continuous and positive feeding of the material to the ram to force the fibrous material into the tube 13.

In operation the shaft 2, is revolved and through the connection previously described, the ram is reciprocated in and out of the tube, the teeth forcing the fibrous material from the hopper into the tube and packing it therein. The feeding fingers force the material downwardly through the fingers and in the seat therebetween, the bottom of the said seat extending considerably below the bottom edge of the teeth, thereby enabling a greater charge of material to be forced forward with each reciprocation of the ram. The material directly in contact with the teeth and in the seat is forced in bulk, forwardly into the tube, and upon the reversal of the movement of the ram the charge or mass of material in between the teeth is left in the tube, and of course at each reciprocation of the ram the material becomes packed in the tube in a solid mass, and is forced out of the free end into the casing.

I am aware I am not the first to employ teeth for forcing the material from the hopper into the tube, nor am I the first in the art to force the material downwardly onto the teeth. However, I believe I am the first in the art to arrange a series of teeth on a ram with a seat between them, the bottom of the seat being considerably below the teeth, in combination with the specific form of feeding means to force the material in the hopper in contact with the teeth and in the seat therein between.

To adapt my machine for making pads I remove the plate 12, and its tube, the ram 7, and substitute therefor a tube such as indicated at 25, and either form of ram shown in Figs. 8 and 9, and indicated at 26. The form of ram shown in Fig. 8, does not have the seats. With some pads it is not necessary to pack them as much as others, for which reason I employ either form of ram according to the desired degree of packing required in the pad. I may also employ stationary fingers indicated at 29, in Fig. 7, to coöperate with fingers 30, the latter being similar to the fingers 20. This construction may be used where the material becomes knotty and it is necessary to subject it to severe treatment preparatory to its being used for stuffing a collar or pad.

What I claim is:

1. In a machine for stuffing collars, the combination with a hopper formed with an opening near its bottom, a tube communicating with the opening, a reciprocating plunger operating in the bottom of the hopper and in the tube, the front portion of the plunger being cut away and formed with teeth along the upper edges of the cut away portion, the space between the teeth forming a pocket, the bottom of the latter being below the bottom plane of the teeth, and means in the hopper for forcing the body of stuffing material downward in the path of movement of the reciprocating plunger.

2. In a machine for stuffing collars, the combination with a hopper formed with an opening near its bottom, a tube communicating with the opening, a hollow reciprocating plunger operating in the bottom of the hopper and in the tube, the front portion of the hollow plunger being cut away and the adjacent edges of the cut away portion having inclined teeth, the cut away portion of the plunger between the teeth forming a pocket having a curved bottom, below the plane of the bottom of the teeth, and means in the hopper for forcing the body of stuffing material downwardly in the path of movement of the teeth.

3. In a collar stuffing machine, the combination with a hopper formed with an opening near its bottom, a tube communicating with the opening, a plunger operating in the bottom of the hopper and tube, said plunger having on its upper front end a plurality of rows of teeth with pockets formed between them, the bottoms of the pockets being below the plane of the bottom of the teeth, and means in the hopper for forcing the stuffing material down in the path of the teeth.

In testimony whereof I affix my signature in presence of two witnesses.

WILLIAM B. ESTES.

Witnesses:
 JNO. IMIRIE,
 CHARLES ALVIN ROGERS.